Patented Apr. 27, 1948

2,440,498

UNITED STATES PATENT OFFICE 2,440,498

POLYMERIZATION CATALYSTS

David W. Young, Roselle, and Henry B. Kellog, Union City, N. J., assignors to Standard Oil Development Company, a corporation of Delaware No Drawing. Application May 15, 1943, Serial No. 487,155

8 Claims. (Cl. 252—199)

This invention relates to low temperature polymerization catalysts, relates especially to alkyl and alkoxy compounds of the Friedel-Crafts metals, and relates particularly to the polymerization at low temperature of olefinic material by the polymerizing action of alkyl and alkoxy compounds of the Friedel-Crafts metals.

It has been found that the lower isoolefins, such as isobutylene, either alone or in admixture with the lower polyolefins, are readily polymerized at temperatures ranging from 0° C. to −100° C. or even as low as −160° C. into high molecular weight polymers by the application thereto of a wide range of Friedel-Crafts catalysts to obtain polymers having molecular weights ranging from 1,000 up to 100,000 or even as high as 500,000. However, difficulty has been encountered in this reaction and polymerization process because of the fact that the catalysts are of relatively very low solubility. Gaseous boron trifluoride is soluble to a very limited extent in the olefinic hydrocarbons, and it is rather easily poisoned in its catalytic action by impurities. Aluminum chloride, and in fact most of the simple Friedel-Crafts halides, show a low solubility in most hydrocarbon substances, and even in ethyl or methyl chloride, the solubility is none too good and the chemical relationships are such that even the whole of the solubility in these alkyl halides cannot always be used.

The present invention provides a new type of soluble, active-metal-halide catalyst in the form of double salts of Friedel-Crafts halide substances combined with esters of the Friedel-Crafts metals with alkyl groups or with alkoxy groups.

Thus, in practising of this invention, compounds are prepared having a general formula of MH.M'A in which M is a Friedel-Crafts metal, H is a halide, M' is a Friedel-Crafts metal, preferably titanium or vanadium or zirconium or silicon, and A is an alkyl radical; or in the form of MOA, in which M is a Friedel-Crafts metal, O is oxygen and A is an alkyl radical; or MH.M'OA in which M and M' are one or more Friedel-Crafts metals, H is halogen, O is oxygen and A is an alkyl radical. In the esters prepared from metallic oxyhalides or metallic oxyhalide compounds the metal may be titanium, aluminum, zirconium, boron, vanadium, uranium or silicon or other similar Friedel-Crafts type metal, as shown in the article by N. O. Calloway on "The Friedel-Crafts Synthesis" printed in the issue of "Chemical Reviews" published for the American Chemical Society at Baltimore in 1935 in vol. XVII, No. 3, the article beginning on p. 327, the list being particularly well shown on p. 375. These organo-metallic compounds show a relatively very high solubility in the hydrocarbon substances and the solutions are effective for the production of relatively very high molecular weight polymers when used in quite high concentration.

Thus the invention provides a new and useful series of organo-metallic catalysts which have a high solubility in a wide range of hydrocarbon substances and are particularly useful for the polymerization of olefinic mixtures at low temperatures. Other objects and details of the invention will be apparent from the following description.

The preparation of the organo-metallic components of the catalyst of the present invention is conveniently accomplished by interaction of the halide, preferably the chloride, of the Friedel-Crafts type metal with an alcohol of the desired alkyl radical. The reaction proceeds smoothly for the elimination of hydrogen chloride, leaving as a residue the desired organo-metallic compound usually in the form of the ester or ether of the alkyl radical with the metal. The resulting compound can not be used as such, but must be combined with further portions of the same or another Friedel-Crafts metal halide to form a double salt of the alkoxy compound with the normal Friedel-Crafts halide.

The catalyst is particularly useful for the polymerization of olefinic materials at low temperature. For this purpose, a preferred component of the reaction mixture is isobutylene, although other isoolefins up to about 7 carbon atoms may be used. The isoolefin may be used alone or it may be admixed with a polyolefin having from 4 to 12 or 14 carbon atoms per molecule. Particularly useful polyolefins are butadiene, isoprene, piperylene, dimethylbutadiene, dimethyllal and myrcene; others of the series of lower polyolefins being equally useful according to their composition. The olefinic material is preferably cooled to a temperature well below its boiling point under atmospheric pressure, either by a refrigerating jacket on the reactor or by the addition of the refrigerant material to the olefinic material. When a refrigerating jacket is used, particularly on a closed refrigerated reaction vessel, practically any of the ordinary refrigerants may be used under a wide range of pressures or vacuums; such substances as liquid propane, liquid ethylene, liquid ethane and liquid methane, liquid ammonia as well as liquid carbon dioxide and liquid sulfur dioxide and the like being suitable. When an internal refrigerant is used, admixed directly with the olefinic reaction material, the choice is somewhat more restricted but solid carbon dioxide, liquid ethylene and liquid ethane are particularly suitable. Liquid methane is also useful, but for most polymerizations the temperature is lower than is necessary. The catalyst as above described is preferably used in solution, for which purpose such solvents as liquid propane, liquid butane, or even liquid pentane may be used. Alternatively, any of the mono- or polyalkyl halides may be used such as methyl or ethyl chloride, provided the freezing point is reasonably low, below about 0° C. to −110° C. The catalyst is also particularly useful for the low temperature polymerization of styrene or alpha methyl styrene either separately, or in admixture, or in admixture with other polymerizable olefins, in a reaction analogous to that shown in the copending application of Sparks, Field and Kellog.

*Example 1*

1 molecular part of titanium tetrachloride (TiCl₄) was mixed with 4.2 molecular parts of anhydrous butyl alcohol, the titanium tetrachloride being added slowly to the alcohol. During the addition the container was cooled with ice water. Substantially all of the chlorine was liberated as hydrogen chloride over the course of about a half hour. At the end of this time the mixture was heated gently under vacuum to remove any residual hydrogen chloride and the excess of alcohol. When the material was allowed to cool, a solid hard white substance was obtained. Upon analysis this product was found to have the formula:

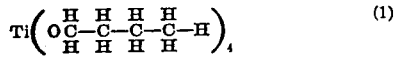 (1)

This material keeps well if sealed but becomes blue when left in contact with air and moisture. The resulting compound is a titanium butoxide which is quite readily soluble in hydrocarbons. However, the catalytic activity for the low temperature polymerization of olefinic materials is relatively poor.

This titanium butoxide was then mixed with finely powdered aluminum chloride in the molecular ratio of 2 mols of aluminum chloride with one mol of titanium butoxide. The mixed substances were ground together in a mortar at room temperature. The heat of reaction was sufficient to cause partial fusion. The material was transferred to a hot air oven at 140° C. for a few minutes during which time the reaction was completed with a formation of a dark colored homogeneous liquid. Upon cooling to room temperature, the material solidified. The material was soluble in the proportion of 7.1% or higher in ethyl chloride at −78° C. This material, as so prepared, was the double salt of titanium butoxide and aluminum chloride. The solubility of the double salt in hydrocarbon substances and in alkyl halides generally was found to be practically the same as the solubility of the titanium butoxide alone; and, in addition, the double salt showed a catalytic power practically as good as the catalytic power of aluminum chloride alone, thereby combining in one substance the high solubility of titanium butoxide and the high catalytic power of aluminum chloride, a combination of characteristics previously unobtainable.

A mixture was prepared consisting of 97 parts by weight of isobutylene of 98% purity and 3 parts by weight of isoprene of 86% purity. This material was placed in a heat insulated reactor and approximately 200 parts by weight of pulverized carbon dioxide were added. When the mixture had reached a temperature of −78° C., approximately 10 parts by weight of a 2% solution of the double salt of aluminum chloride and titanium butoxide in methyl chloride were added to the olefinic mixture. The polymerization reaction proceeded very evenly (at a constant rate) and slowly and at the end of approximately 2 hours a considerable quantity of solid white polymer formed, amounting to approximately 70% of the olefinic material originally present. At this point the reaction mixture was dumped into warm water to volatilize the residual solid carbon dioxide, the residual isobutylene and isoprene and the residual methyl chloride, and in addition, to hydrolyze and inactivate the catalyst material. The solid polymer was removed from the water, washed on the mill with further quantities of water, dried and compounded according to the following recipe:

| | Parts |
|---|---|
| Polymer | 100 |
| Carbon black | 10 |
| Zinc oxide | 5 |
| Stearic acid | 3 |
| Sulfur | 3 |
| Tuads (tetramethyl thiuram disulfide) | 1 |
| Captax (mercaptobenzothiazole) | 1 |

This recipe was compounded on the open roll mill and the compounded material was then cured under pressure at a temperature of 137° C. for 60 minutes. Samples cut from the cured material showed a tensile strength of approximately 2,000 pounds per square inch, an elongation of approximately 1,000% and a good modulus of 410 lbs. at 300% elongation.

Thus the polymer of the present invention produces a highly valuable synthetic rubber material.

*Example 2*

100 parts by weight of isobutylene at its boiling point were mixed with 10 parts by weight of a 2% solution of the double salt of aluminum chloride with titanium butoxide in methyl chloride prepared as indicated in Example 1. A moderately rapid polymerization reaction occurred to yield a clear, moderately heavy oil which was found to have a molecular weight, as determined by the Staudinger method, between 1,000 and 2,000.

The above examples are representative of the low molecular weight esters of the Friedel-Crafts metal oxyhalides. A considerable number of other similar low molecular weight esters of the Friedel-Crafts metal oxyhalides are likewise useful, such as those given in the following list:

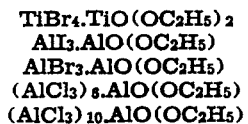

*Example 3*

A catalyst was prepared by the procedure described in Example 1, but with the further step of the use of a current of dry nitrogen over the mixture to sweep out rapidly the hydrogen halide formed to avoid interaction of the halide with the unreacted alcohol, since such reaction yields water which hydrolyzes the previously formed basic ester alkoxides. Equal molecular parts of aluminum chloride and ethyl alcohol were used in the preparation of the catalyst, the alcohol being added dropwise to the aluminum chloride; otherwise, the reaction being conducted as above described. When the excess alcohol and residual traces of hydrogen chloride had been removed by heating under vacuum, the material was cooled, pulverized and mixed with 6 molecular weight parts of pulverized aluminum chloride, the two materials being ground together in a mortar as before and the reaction continued by gently heating in a hot air oven. The completed double salt was then dissolved in methyl chloride to yield a solution containing approximately 0.8% by weight of the solid catalyst material. A mixture was then prepared consisting of 99 parts by weight of isobutylene having a purity of 98% with 1 part by weight of isoprene having a purity of approximately 86%, together with 300 parts by weight of solid pulverized carbon dioxide. The mixture was prepared in a heat insulated reactor and to it was added approximately 10 parts by weight of the catalyst solution prepared as above described. The polymerization reaction proceeded at a very uniform rate and relatively slowly, and after 1½ hours approximately 60% of the olefinic material was found to be polymerized into a solid white polymer. The reaction mixture was then dumped into warm water, the solid polymer recovered therefrom and further washed and then dried on the mill and then compounded according to the recipe given in Example 1. After curing as in Example 1, the material was found to have a tensile strength of 2,000 pounds per square inch, an elongation of 740% at break and a modulus at 300% elongation of 550 pounds per square inch.

*Example 4*

A catalyst was prepared by slowly mixing together at about 0° C. 1 molecular weight part of titanyl chloride (TiOCl₂) and 2 molecular weight parts of ethyl alcohol in the presence of a current of dry gaseous carbon dioxide. A reaction occurred for the liberation of hydrogen chloride which was swept out by the stream of carbon dioxide. When the reaction was approximately complete the residual traces of hydrogen chloride and excess alcohol were removed by very gentle heating under a vacuum. Upon cooling, the liquid solidified. The white solid material was pulverized and mixed with 1 molecular weight part of titanium tetrabromide. The reaction yielded a substantial amount of heat and the completion of the reaction was obtained by gently heating in a hot air oven to yield the double salt which solidified upon cooling. A solution of this catalyst in methyl chloride was prepared containing approximately 0.16% of the solid catalyst material.

The solubility of TiBr₄ in methyl chloride is about zero. However, when TiBr₄ is reacted with TiO(OC₂H₅)₂ a catalyst material soluble in methyl chloride is obtained. A mixture was then prepared consisting of 99 parts by weight of isobutylene having a purity of approximately 98% with 1 part by weight of isoprene having a purity of approximately 86%. This mixture was placed in a heat insulated reactor with approximately 300 parts by weight of pulverized solid carbon dioxide. When the temperature of the olefinic material had reached approximately −78° C., 10 parts by weight of a catalyst solution as above described were added to the olefinic mixture with gentle stirring. After approximately 2 minutes the solution turned in color from a light yellow to a dark red and finely divided particles of solid emulsion formed. The particles of polymer eventually coalesced and the reaction mixture was dumped into warm water when approximately 70% of the original olefinic material had polymerized into solid polymer. The polymerization mixture was treated to destroy the catalyst and the polymer was washed on the mill with water and then compounded according to the recipe in Example 1. Uncompounded samples of the polymer were found to have molecular weights of approximately 30,000 as determined by the Staudinger method. The compounded material was cured under heat and pressure, as in Example 1, and after curing, was found to have a tensile strength of approximately 2,000 pounds per square inch with an elongation at break of approximately 800% and a good modulus.

These examples are representative of a wide range of alkoxy compounds of the Friedel-Crafts metals and of the double salts of alkoxy compounds with the ordinary Friedel-Crafts compounds. It may be noted that the double salt may contain one Friedel-Crafts metal only, or may contain two or even more different Friedel-Crafts type metals. The present available information indicates that any of the lower hydrocarbon radicals having from 1 to 7 or 8 carbon atoms per radical are useful for the formation of the alkoxides, and any combination of Friedel-Crafts metals and metal halides may be used. These alkoxides of titanium with Friedel-Crafts metal halides are of the type as listed below:

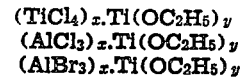

wherein $x$ is an integer from 1 to 20 and $y$ is an integer of 1.

Thus the invention provides a new Friedel-Crafts catalyst which is readily soluble in hydrocarbon liquids and alkyl halides to yield a catalyst which is capable of producing polyisoolefins and a highly valuable synthetic rubber.

Although there are above disclosed but a limited number of embodiments of the catalyst and process of the invention, it is possible to produce still other embodiments without departing from the inventive concept herein disclosed, and it is therefore desired that only such limitations be imposed upon the appended claims as are stated therein.

The invention claimed is:

1. A low temperature polymerization catalyst active between 0° C. and −100° C. in the form of a solution in an aliphatic solvent having from 1 to 5 carbon atoms per molecule which is liquid below 0° C.; of a double salt composed of a Friedel-Crafts active metal halide catalyst and a titanium alkoxy compound in which the alkoxy radical has a carbon atom number within the range between 1 and 8 inclusive.

2. A low temperature polymerization catalyst active between 0° C. and −100° C. in the form of a solution in an aliphatic solvent having from 1 to 5 carbon atoms per molecule which is liquid below 0° C.; of aluminum chloride and a titanium alkoxy compound having a carbon atom number within the range between 1 and 8 inclusive per molecule.

3. A low temperature polymerization catalyst active at a temperature between 0° C. and −160° C. in the form of a solution in butane of a double salt of aluminum chloride and a titanium alkoxide having a carbon atom number within the range between 1 and 8 inclusive per molecule.

4. A low temperature polymerization catalyst active at a temperature within the range between 0° C. and −160° C. in the form of a solution in butane of a double salt of aluminum chloride and titanium butoxide.

5. A low temperature polymerization catalyst active at a temperature within the range of between 0° C. and −160° C. in the form of a solution in butane of a double salt of aluminum chloride and titanium ethoxide.

6. A low temperature polymerization catalyst active at temperatures within the range between 0° C. and −160° C. in the form of a solution in an aliphatic type solvent having from 1 to 5 carbon atoms inclusive of a double salt of aluminum chloride and titanium butoxide.

7. A low temperature polymerization catalyst active at a temperature between 0° C. and −160° C. in the form of a solution in butane of a double salt of titanium chloride and a titanium alkoxide having a carbon atom number within the range between 1 and 8 inclusive per molecule.

8. A low temperature polymerization catalyst active at a temperature between 0° C. and −160° C. in the form of a solution in ethyl chloride of a double salt of aluminum chloride and a titanium alkoxide having a carbon atom number within the range between 1 and 8 inclusive per molecule.

DAVID W. YOUNG.
HENRY B. KELLOG.

REFERENCES CITED

The following references are of record in the file of this patent:

UNITED STATES PATENTS

| Number | Name | Date |
|---|---|---|
| 1,459,852 | Mugdan et al. | June 26, 1923 |
| 1,793,935 | Kaufler et al. | Feb. 24, 1931 |
| 2,301,615 | Chenicek et al. | Nov. 10, 1942 |
| 2,356,128 | Thomas et al. | Aug. 22, 1944 |

OTHER REFERENCES

Ulich et al., Z. Physick. Chem., vol. A 165, pages 294–310, 1933, Abstracted in Chem. Abstracts, vol. 27, page 5232, 1933.

Betse, Prakticka Akad Athenon, vol. 6, pages 148–53, 1931, Abstracted in Chem. Abstracts, vol. 27, page 3193, 1933.